Jan. 14, 1964   K. W. HARRINGTON   3,118,046
ELECTRIC ARC TORCH
Filed May 3, 1961   2 Sheets-Sheet 1

KENT W. HARRINGTON
INVENTOR.

BY Wm O Moeser

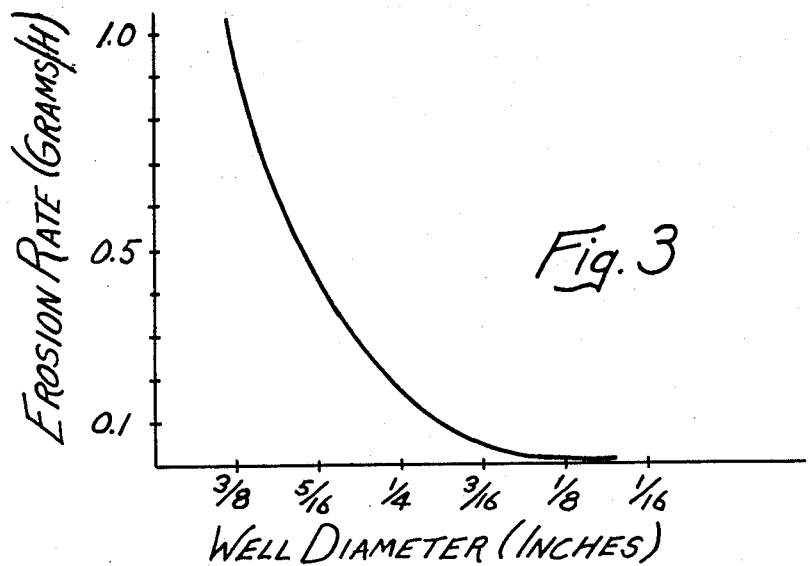
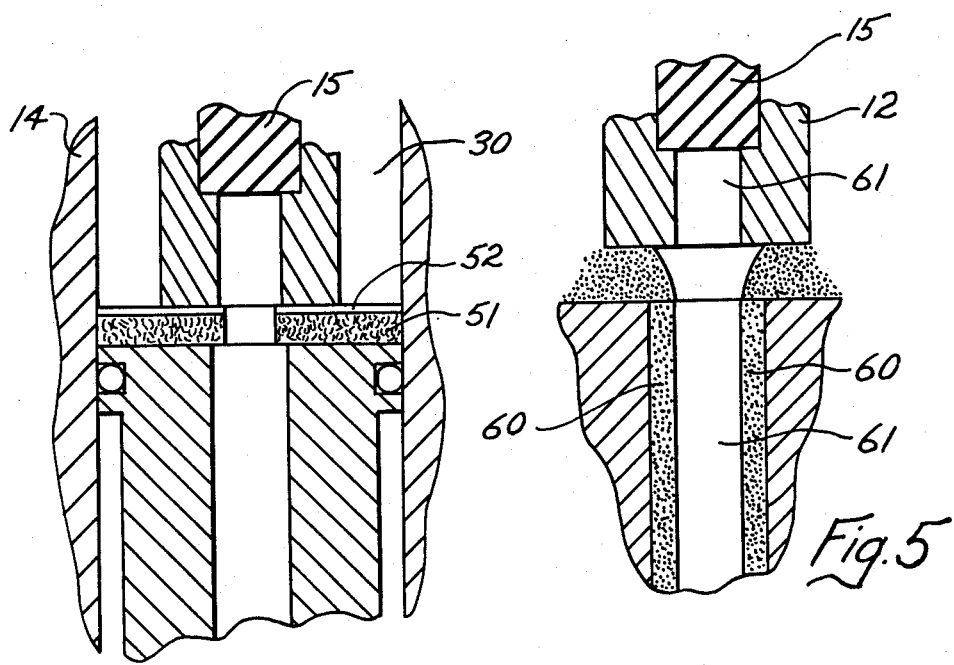

United States Patent Office 3,118,046
Patented Jan. 14, 1964

3,118,046
ELECTRIC ARC TORCH
Kent W. Harrington, Hanover, N.H., assignor to Thermal Dynamics Corporation, a corporation of New Hampshire
Filed May 3, 1961, Ser. No. 107,421
7 Claims. (Cl. 219—75)

My invention relates to electric arc torches and relates more particularly to an improved form of torch having an electrode geometry enabling it to be used with reactive gases, including air.

Arc torches in present-day use have electrode arrangements which make them unsuitable for use with reactive gases. For example, when using the least expensive gaseous mixture—air—the electrodes must be shielded by a flow of relatively far more expensive non-reactive gas, such as argon, helium or nitrogen. In accordance with my invention, no shielding gases are required. Gas flow patterns in the immediate vicinity of the emitting area of the cathode are so controlled as to minimize the contact of fresh supplies of reactive gases to the hot cathode surface. I have been able to keep both chemical and mechanical erosion of the cathode to an acceptable minimum, even when using air as the sole source of plasma forming gas. This, of course, leads to a highly favorable operating cost and eliminates the complexity of introducing and controlling various gases in the torch, some primarily to form plasma streams, and others for shielding purposes.

It is therefore a principal object of my invention to provide a new electric arc torch having electrode geometry which permits the use of reactive gases.

It is another object of my invention to produce a torch capable of operating as described above with simple, inexpensive structures not requiring complex controls or elaborate manufacturing techniques.

A further understanding and appreciation of the invention may be had from the following description and drawings, in which FIGURE 1 is a longitudinal view in cross section of a torch constructed in accordance with the principles of my invention;

FIGURE 3 is a graph plotting electrode erosion rate against an electrode dimension hereinafter to be explained;

FIGURE 4 is an alternate embodiment of the invention and showing the same general region of a torch as FIGURE 2; and FIGURE 5 is a cross sectional view of the cathode-nozzle entrance area showing the core region of a vortex and its relation to electrode geometry.

Figure 1:
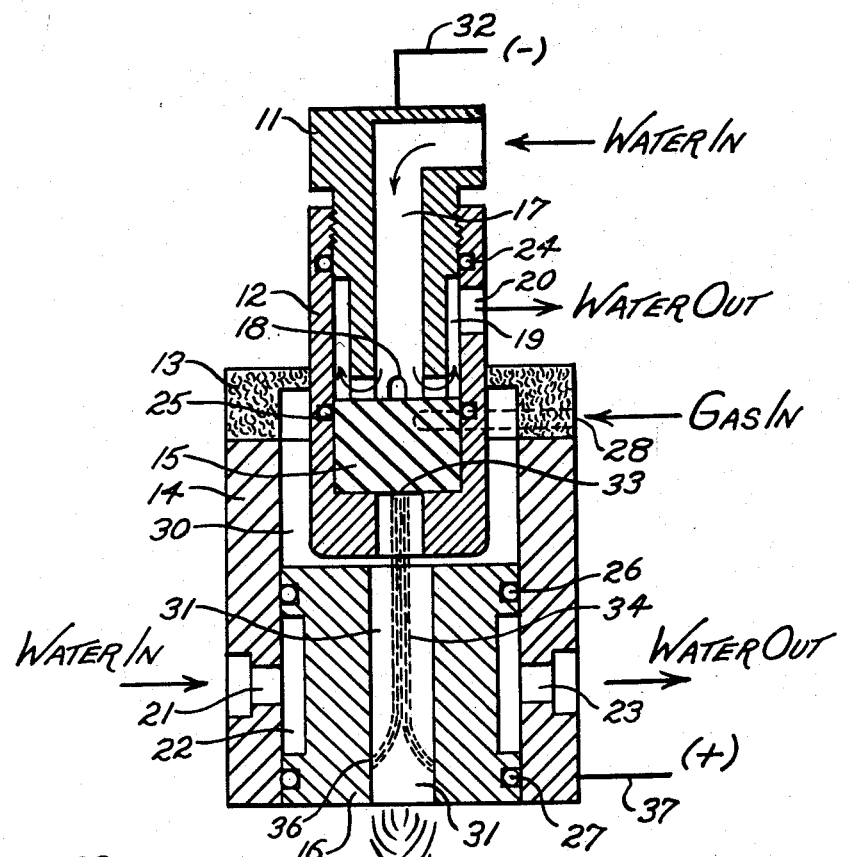

Referring now more particularly to FIGURE 1, I show an electric torch of the general genre exemplified by that of the Thorpe patent, No. 2,960,594. The torch of FIGURE 1 is shown, merely for convenience, in the non-transferred mode of operation; that is, the arc begins and terminates within the torch structure itself. In the transferred mode, a workpiece forms a part of the arc circuit. It should be explained here that my invention is equally applicable to both modes of operation.

The torch of FIGURE 1 is also shown, for convenience, operating with straight-polarity D.C. power. Following the electron circuit, electrons are delivered to piece 11 through a lead 32 from a suitable power source, not shown. The electrons pass through cylinder 12 into which the piece 11 is threaded. A refractory electrode 15 fits snugly in the cylinder 12 as shown. Electrons pass into the electrode 15 and emerge from an arc spot 33 to form an arc column shown at 34. The arc column extends down a passage 31 in nozzle piece 16 and, in this non-transferred mode, the arc impinges against the inner wall of the passage at 36. The electron current then passes through nozzle piece 16 and torch body 14 to the positive terminal of a suitable power source by means of lead 37.

Piece 11 is threadably connected to the cylinder 12 to provide convenient access to the electrode 15 for replacement as required. Water is introduced under pressure to channel 17 through an opening as shown and impinges at high velocity against the electrode 15 to provide cooling action. This water then passes through apertures 18, annular chamber 19, and exits from the torch at 20.

An electrically insulating member 13 holds the negative electrode assembly in proper position with respect to the main body of the torch. A water jacket is also supplied around the nozzle piece 16. Water enters the jacket 22 through the aperture 21 and leaves the torch through aperture 23. Sealing of the cooling water from the operating regions of the torch may be accomplished by rings 24, 25, 26 and 27.

As stated above, the arc column extends down into the nozzle piece 16. The reason for this is the fact that plasma forming gas, in this case air, is so introduced as to form an arc-stabilizing vortex swirling around and down into the nozzle passage. To accomplish this, I introduce air under pressure at 28, by means of which the gas tangentially enters the annular chamber 30. It will be noted that up to this point the active surface of electrode 15 is remote from the flow of air, since such surface forms the bottom of a well 48, best shown in FIGURE 2.

Figure 2:
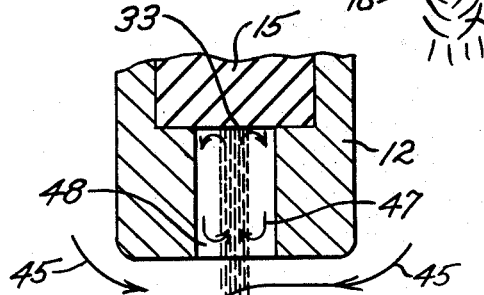
FIGURE 2 is a detailed view, in cross section, of the cathode and nozzle entrance regions of the torch of FIGURE 1.
Figure 2:
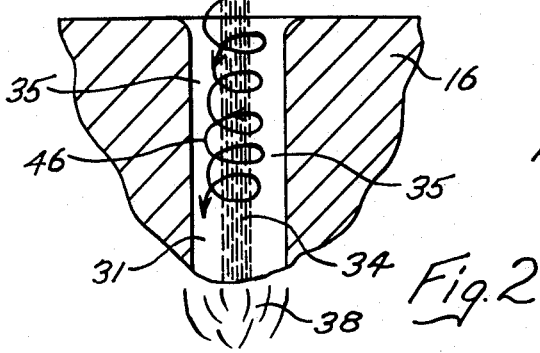

The gas vortex flows next into the region separating the end of cylinder 12 from nozzle piece 16 (FIGURE 2). The arrows 45 and 46 depict the main stream of this flow. Substantially all the gas passes down the nozzle, becomes heated by the arc stream, and emerges as a plasma effluent at 36. An annular cool region, at 35, keeps the arc away from the nozzle wall until the arc column reaches the point 38. This general technique is known as gas stabilization and performs the dual purpose of controlling the arc length and providing a heat exchange relationship between gas and arc, as taught in the Thorpe patent referred to.

Only a small portion of reactive gas initially enters the well 48. The reactive element in air, oxygen, if continually replenished, would quickly oxidize and destroy the hot surface of the electrode 15. Some, though not a significant amount, of the electrode material may be initially oxidized. However, due to the well geometry, the major portion of the residual well gases are slowly recirculated as depicted by the arrows 47 in FIGURE 2. The oxygen content of this reciprocating gas has been depleted, and such gas may be termed chemically "dead." Flow of fresh, reactive gas is substantially eliminated. However, this "dead" gas may partake of the rotating motion of the vortex which is continuously energized by the fresh supply of air into the nozzle region. Thus, the arc is effectively stabilized at the center of the well.

In carrying out the purposes of my invention, the geometry of the well itself is important. That is, the well depth to well diameter ratio must be carefully chosen. While this phenomenon is not completely understood, I theorize that the higher this ratio, the greater the recirculation of "dead" gas and the less the likelihood of fresh reactive gaseous components reaching the electrode surface. This is in itself desirable. However, if the well becomes too deep, the arc will not remain effectively stabilized at the electrode center. This is because in all probability any vortex imparted to the well gases does not extend with desired intensity to create a low pressure center at the electrode surface. Suffice to say, these dimensions are important to effective torch operation.

Table I shows the marked effect of changes in well configuration.

*Table I*

| Run No. | Nozzle Diam., inches | Well Diam., inches | Well Depth, inches | Chamber Pressure, p.s.i. | Power, kw. | Gas Flow, s.c.f.h. | Erosion Rate, g./hr. | Run Duration, hr. |
|---|---|---|---|---|---|---|---|---|
| 1 | 7/32 | 1/4 | 3/8 | 13 | 48 | 320 | 0.4 | 1/2 |
| 2 | 3/16 | 3/16 | 1/4 | 20 | 36 | 300 | 0.1 | 1 |
| 3 | 3/16 | 3/16 | 3/8 | 20 | 30 | 280 | 0.02 | 5 |
| 4 | 3/16 | 3/8 | 3/8 | 20 | 40 | 150 | 1.0 | 1 |

In addition, another ratio has been empirically found to contribute significantly to operating performance. That is the ratio of well diameter to nozzle diameter. Best results were achieved when the diameter of the well was equal to or less than the diameter of the nozzle passage. FIGURE 3 is a graph relating erosion to well diameter, with other factors constant, using a nozzle 3/16″ in diameter. Erosion rate continues to drop significantly until the well diameter becomes equal to or less than nozzle diameter. Air was used as the sole gas in developing the graph of FIGURE 3 and Table I above.

In FIGURE 4, I use a "swirl ring" 51 as described in copending application Ser. No. 56,221, now Patent No. 3,027,446, dated March 27, 1962, to further increase vortex intensity. Slots 52 are tangentially arranged and gas is introduced through them into the nozzle passage from chamber 30. Tangential introduction of gas to chamber 30 is unnecessary in this case.

While I have discussed the ratio of well diameter to the actual diameter of the nozzle, there may be a more fundamental relationship in evidence. That is the ratio of well diameter to the diameter of a vortex core under a given set of conditions.

This possibility is illustrated by FIGURE 5. The annular dotted region 60 is characterized by a high-velocity vortex gas flow at a static pressure well above that the core. At the core there is little gas circulation and the pressure is well below atmospheric, as in regions designated 61. I make the well diameter the same as, or preferably less than, the diameter of the vortex core. Under such conditions no high pressure, high velocity vortex wall reaches the electrode surface at the bottom of the well. The well region is thus, in effect, "all core"; and a quiescent state or a condition of low-momentum gas flow in the well region is achieved.

Thus not only is chemical action substantially avoided, but erosion due to the purely mechanical effects of gas flow at the electrode surface is eliminated.

In order to further promote centrality of the arc in the well 48 a surface discontinuity may be provided, by a drill point machining a slight indentation at the spot 33, FIGURE 1. Such a discontinuity will be conducive to starting and maintaining an arc from the center of the working surface of the electrode 15. This technique is further explained in copending application, Serial No. 84,569, by James A. Browning and Kent W. Harrington, now Patent No. 3,061,710, dated Oct. 30, 1962.

The principles of my invention are equally applicable to torches using reversed polarity or alternating current.

Various modifications within the spirit and scope of the following claims will occur to persons skilled in the art.

I claim:
1. In an electric arc torch, a first electrode having a surface from which an arc may be initiated, a hollow cylindrical member extending from said surface to form a well with said surface as the bottom thereof, and a second electrode spaced from said member and having an elongated nozzle passage collinear with said well, the ratio of well diameter to nozzle diameter being one or less than one.

2. In an electric arc torch, a first electrode having a surface from which an arc may be initiated, a hollow cylindrical member extending from said surface to form a well with said surface as the bottom thereof, and a second electrode spaced from said member and having an elongated nozzle passage collinear with said well, the ratio of well depth to well diameter being less than three to one.

3. An electric arc torch according to claim 2 in which the ratio of well diameter to nozzle diameter is one or less than one.

4. In an electric arc torch, a first electrode having a surface from which an arc may be initiated, a hollow cylindrical member extending from said surface to form a well with said surface as the bottom thereof, a second electrode in the form of a nozzle spaced from said member and having an elongated arc passageway aligned with the axis of said well, means for establishing an arc between said electrodes, and means for introducing a plasma forming gas in a vortex flow around said member and into the passageway of said second electrode.

5. An electric arc torch according to claim 4, in which the diameter of said well is less than the diameter of the vortex core developed between said electrodes.

6. An electric arc torch according to claim 4 in which the ratio of the depth to the diameter of said well is less than three to one.

7. In an electric arc torch, an improved electrode structure comprising an element with an arcing surface thereon, a hollow cylindrical member extending from said arcing surface to form a well with said surface as the bottom thereof, and a nozzle having an arc passageway therein extending from the opening of said well.

References Cited in the file of this patent
UNITED STATES PATENTS 2,806,124    Gage    Sept. 10, 1951
2,768,279    Rava    Oct. 23, 1956